United States Patent [19]

Barbier

[11] 3,711,653
[45] Jan. 16, 1973

[54] SYSTEM FOR RECORDING AND PRESENTING AUDIO INFORMATION TO OCCUPANTS OF A VEHICLE

[76] Inventor: Pierre Emile Barbier, 17 rue de Docteur Decorse, Saint-Maurice, France

[22] Filed: April 15, 1971

[21] Appl. No.: 134,291

[30] Foreign Application Priority Data

May 6, 1970 France..............................7016649
June 25, 1970 France..............................7023652

[52] U.S. Cl......................179/100.1 C, 179/100.2 S
[51] Int. Cl....G11b 15/52, G11b 23/36, G11b 27/14
[58] Field of Search........179/100.1 C, 100.2 S, 1 VE

[56] References Cited

UNITED STATES PATENTS 3,493,692  2/1970  Jones..............................179/100.1 C
3,575,575  4/1971  Kean..............................179/100.1 C
2,965,720  12/1960  Bumstead......................179/100.2 S Primary Examiner—Stanley M. Urynowicz, Jr.
Assistant Examiner—Raymond F. Cardillo, Jr.
Attorney—Beveridge & DeGrandi

[57] ABSTRACT

There is disclosed a system for recording and presenting information in an audio format to operators and passengers of vehicles. In the recording and presentation, the information is correlated to the distance traveled by a sensing device coupled to sense operation of the vehicle odometer.

6 Claims, 3 Drawing Figures

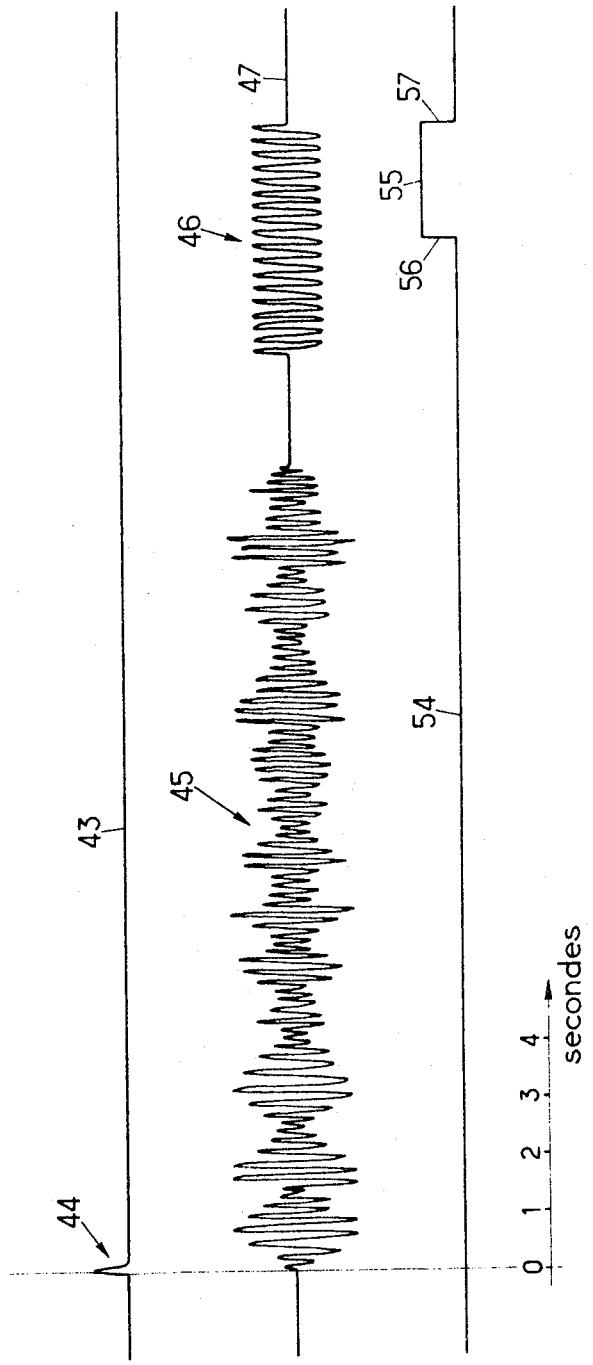

SYSTEM FOR RECORDING AND PRESENTING AUDIO INFORMATION TO OCCUPANTS OF A VEHICLE

The invention relates to a device intended to be mounted on a vehicle thereby furnishing furnishing, in acoustic format, information correlated to the distance traveled by the vehicle.

Such systems are already known which use, a reduction drive and a generally complex tape recorder, either using use of several tracks, or using control frequencies beyond the audible range, both of which complicate the amplifier and the tape advance mechanism.

The object of the invention is to provide an extremely simple apparatus, using a conventional, widely used and relatively inexpensive tape recorder.

The invention includes intermittent recordings on an ordinary tape recorder. Each time that the vehicle has covered a given distance the tape recorder is started up, there is recorded a specific period of spoken words followed by a marking period of much shorter duration, wherein the voice frequencies are replaced by a well-defined audible marking note.

In parallel with parallel with a sound reproducing loud speaker is an integrator amplifier which triggers the halt of the recorder only when the resultant marking signal stops. The acoustic signal is only applied to, this amplifier integrator during the second half of the marking period, thus allowing considerable tolerance as to recording speed and sound reproduction, as well as the frequencies and times developed within the apparatus. Detection of the distance travelled is obtained from a sensor coupled to or driven directly by the vehicle drive, which sends pulses to a counter that sends on a resulting signal that corresponds to the desired distance. The duration of the various periods is also determined by an oscillator, which establishes the time base, in association with a second pulse counter having three outputs corresponding to the start, middle and end of the marking period.

In order to make the subject of the invention better understood, there will now be described as illustration, without any limiting character whatsoever, an embodiment as exemplified and illustrated in the attached drawing, in which:

FIG. 3 is the schematic characteristic of the curves that are representative of the various signals generated by the apparatus.

Figure 1:
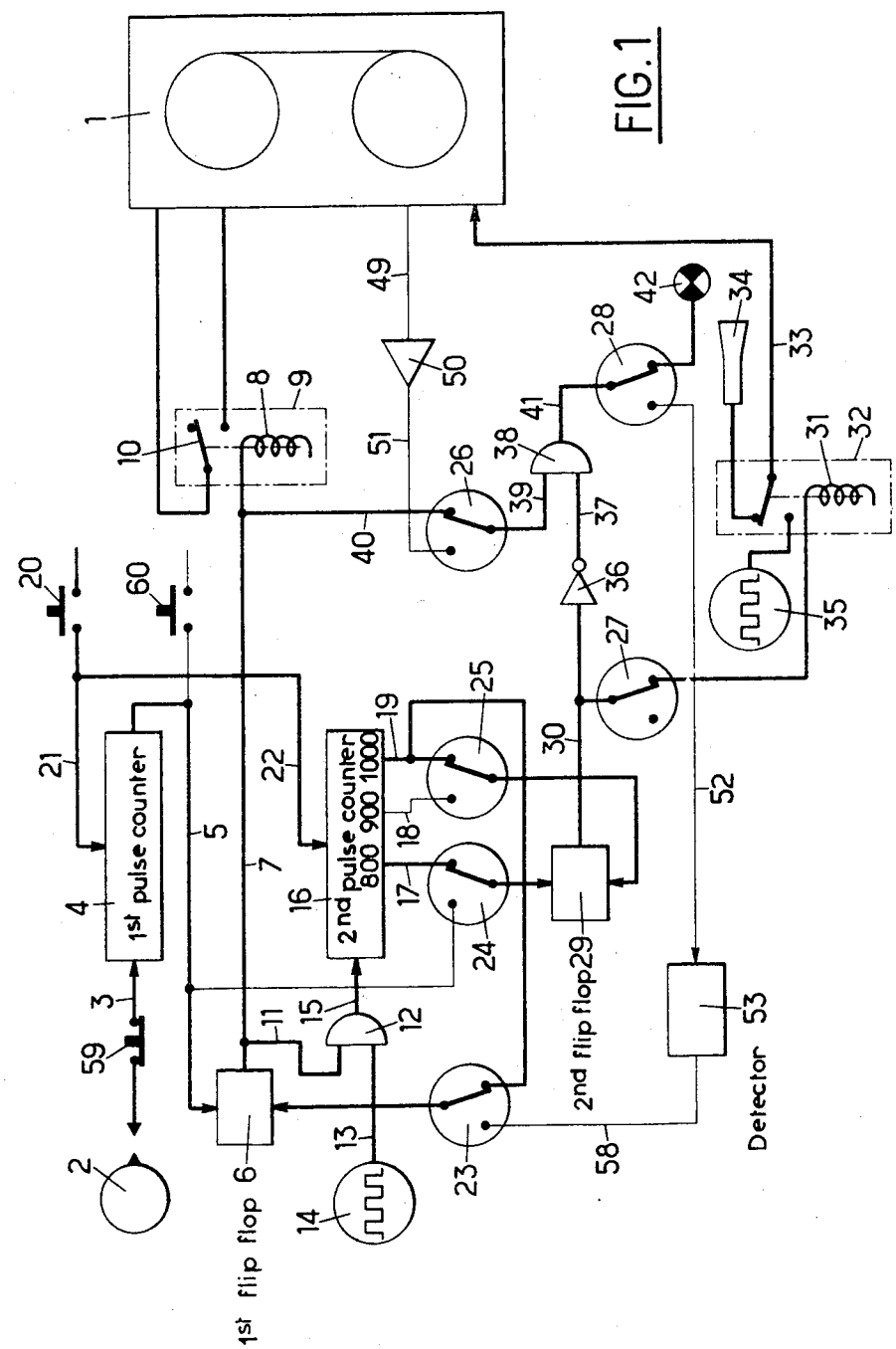
FIG. 1 shows the general electric diagram of the apparatus in recording position.

The apparatus of the invention (see FIGS. 1 and 2) comprises; firstly, an ordinary a tape recorder 1, with a single reading head and without any special adjusting device which could be, for example, a cassette type recorder, allowing ready changing of the tape. Secondly, it includes a sensor 2 connected directly to the odometer. It is known that, according to automobile standards presently in effect, the odometer makes exactly one rotation for each meter that the vehicle travels. The sensors can be of any type, whether with mechanical contact, or by means of an electronic, capacitive, magnetic or optical device; and it may include an amplifier, antiparasitic device and/or a device for the reshaping of pulses. While in the following description the metric system of distance is used, it will be apparent that miles or other units of measurement may be used as well.

Thirdly, the device includes, between sensor 2 and tape recorder 1, a logic circuit which effects all the connections that are necessary for the various functions. The pulses produced by sensor 2 for each meter travelled arrive via line 3 at a pulse counter 4; constituted, for example, by three integrated circuits in series, each performing division by ten, so that the whole effects division by one thousand. Thus, counter sends conductor 5 a pulse each time that it has received one thousand pulses via line 3; that is, each time that the vehicle has moved forward one kilometer.

The said conductor 5 carries the 'kilometer' pulses to the input of the 'first flipflop' 6 which switches to the 1 state on the arrival of a new pulse. In this state, 'flip-flop' 6 polarizes or energizes a line 7 that feeds the winding 8 of a relay 9 whose contact 10 closes the starting circuit for tape recorder 1 (such contact may, for example, be the "remote" switch on the recorder 1). A line 11, branched on 7, also polarizes off energizes an input of the first 'AND gate' 12 which receives at the same time, via another input 13, square pulses produced by an oscillator 14 whose period of 20 milliseconds. Output 15 of 'AND gate' 12 drives a second pulse counter 16, analogous to pulse counter 4, but having instead three outputs 17, 18 and 19 corresponding respectively to 800, 900 and 1000 pulses counted. The two counters 4 and 16 automatically start at zero each time that they have reached the figure 1000. In addition, a button or switch 20 makes it possible via lines 21 and 22 to manually set the two counters 4 and 16 to zero.

Figure 2:
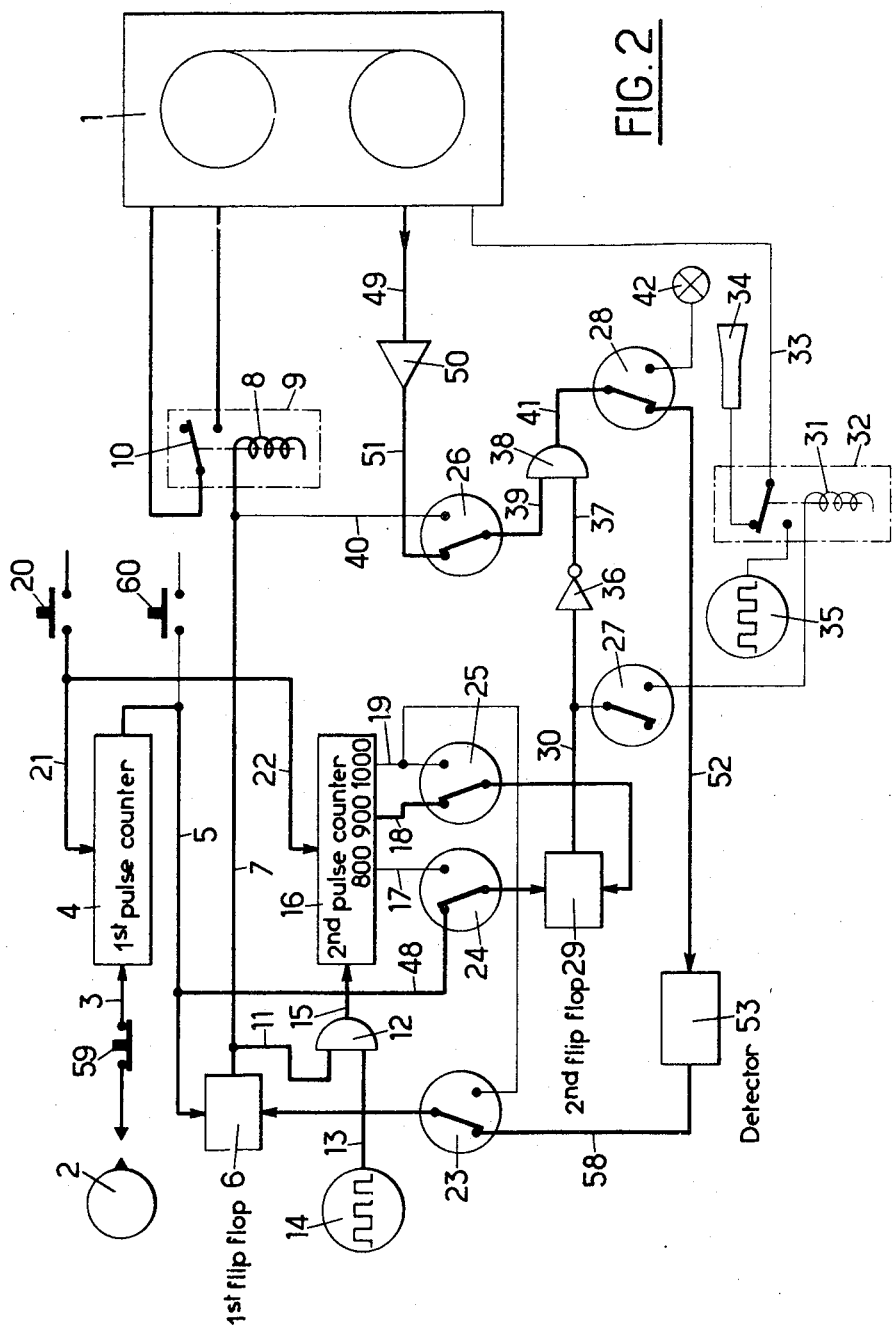
FIG. 2 shows the same diagram, in the reading position.

The circuit comprises on the other hand a switch with six switching stages 23, 24, 25, 26, 27 and 28 all of which are flipped or switched to the right when the apparatus is in the recording position (FIG. 1) and all gang switched to the left when the apparatus is in the reading position (FIG. 2). Of course, these switching stages can largely be replaced by electronic devices without changing the diagram.

The circuit includes a second flip-flop 29 whose triggering is controlled by 24 and the zero reset by 25. This flipflop, in its 1 state, polarizes a line 30 that feeds directly, via 27, the winding 31 of a relay 32 whose contact in the non operating position connects line 33 (tape recording) to microphone 34, and in the operating position, this same line 33 to a second oscillator 35 with frequency of 2 kc/second. Line 30 supplies, on the other hand, an inverter amplifier 36 and the output 37 of this amplifier is connected to a second AND gate 38 whose input 39 is connected by 26 and 40 to line 7 of the first flip-flop 6. Finally, output 41 of AND gate 38 is connected by conductor 28 to indicator or signal device 42.

Initially, the two 'flipflops' 6 and 29 are in the 0 state, and the two counters 4 and 16 are set at zero. Counter 4 counts the pulses received from sensor 2 and it is only when this number reaches 1000 that a pulse travels via 5 to flipflop 6 and puts it into state 1 which produces on the one hand, via conductor 11 and gate 12, the startup of counter 16 and on the other hand via line 7 the excitation of relay 9, starting tape recorder 1 and via conductor 40, switch 26, conductor 39 and gate 38 as well as by conductor 41 and switch 28, the ignition of signal indicator 42, indicating that the apparatus is ready to record. Flipflop 29 is at zero and, therefore, line 30 is in 0 state and line 37 is in state 1. At the same time, it is to be seen that relay 32 is inoperative and that recording line 33 is connected to microphone 34.

The user then can speak into the microphone 34 and record what he wants during the whole time that is required by counter 16 to count 800 pulses of oscillator 14, i.e., 16 seconds since the period of this oscillator is 20 milliseconds as shown above. At the end of the 16 seconds, line 17 is polarized or energized and via switch 24 establishes state 1 of flipflop 29, which has the effect of inverting the state of the signed on lines 30 and 37 and, consequently extinguishing signal 42 as well as the excitation of relay 32. The user is thus warned that he should stop his recording and the contact of relay 32 switches the recording line 33 on oscillator 35 which records, instead of sound, the 2 kc/sec marking frequency.

When counter 16, which still continues to count off pulses of oscillator 14, reaches the number 1000 (which occurs 4 seconds later), it sends at 19 a pulse that causes, via switch 25, the setting to zero of flipflop 29 and, via switch 23, the resetting to zero of flipflop 6. As a result, on the one hand, relay 9 returns to the inoperative or deenergized state and stops the tape recorder 1 and, on the other hand, line 30 returns to state 0 and line 37 to state 1. However, signal 42 remains extinguished, given that an input on line 39 of AND gate 38 assumes the 0 state. The apparatus is thus back in its original position, ready to function again when it receives a new kilometer pulse via line 5 from counter 4.

In FIG. 3, the representative curves of various signals within the apparatus have been drawn as a function of time (and not as a function of kilometers) of various signals moving in the apparatus. Curve 43 in particular shows the kilometer pulses 44. Their spacing as a function of time depends of course upon the average speed of the vehicle in the course of each kilometer. In what follows, it will be assumed that the average speed of the vehicle in the course of each kilometer is always below 180 km/hour, so that the kilometer pulses 44 occur with more than 20 seconds interval (e.g. 30 seconds for 120 km/hour and 60 seconds for 60 km/hour). In these conditions, no kilometer pulse can occur before the end of the complete preceding cycle which takes 20 seconds, hence 16 seconds maximum for recording 45 of the voice message and 4 seconds for recording 46 of the marking frequency as shown on curve 47. With a cassette capable of approximately 30 minutes recording approximately, there can consequently be recorded 90 successive sequences representing a path of 90 km. With a reversible cassette, there can be double this recording. Obviously, cassettes having longer or shorter tapes, corresponding to longer or shorter time may be used; and, also, faster or slower tape drive may be used.

Assume now that the same trip is traveled again after having replaced the magnetic tape of recorder 1 in its starting position and placing the various switching units 23 to 28 of the switch in the reading position, i.e., switched to the left as shown in FIG. 2. As before, each time that the vehicle has traveled 1 kilometer, counter 4 developes a kilometer pulse that places flipflop 6 in state 1 and thus, via relay 9, puts the recorder into operation. At the same time, line 11 opens gate 12 and allows counter 16 to count the pulses of oscillator 14 in order to determine the time of reproduction. A line 48, branched with line 5, also sends, via 24 the kilometer pulse to the second flipflop 29 to place it in state 1, which has the effect of placing line 30 in state 1, hence line 37 in state 0.

At the same time, the signal furnished by the reading of the magnetic tape passes via a line 49 branched on the loudspeaker of recorder 1 and then, after having been amplified by an amplifier 50, passes via line 51 and contact 26 before reaching the second input 39 of AND gate 38 which is closed because line 37 is in 0 state, as we have seen. Therefore, there is no signal issuing from output line 41.

It is only at the end of 18 seconds of operation, i.e., when counter 16 has reached 900 pulses — that the line 18 is energized and supplies, via 25, the reset to zero of the second flipflop 29, which has the effect of placing line 30 in state 0 and line 37 in state 1. Gate 38 then allows the signal furnished by the recorder to pass to line 41, represented by curve 47 of FIG. 3. Since there are exactly 18 seconds between 16 and 20, the opening of gate 38 occurs in principle precisely in the middle of marking signal 46, so that this is only read during the last two seconds.

The signal that is obtained is sent via switch 28 and via a line 52 to a detector 53 formed by an integrator amplifier which thus integrates the signal represented by curve 54 and which is simply a rectangular wave 55 whose leading edge 56 corresponds to the opening of gate 38, i.e., to the counting of 900 seconds by counter 16, and whose trailing edge 57 corresponds to the end of marking signal 46. Detector 53 only detects the trailing edge 57 and sends at this moment, via line 58 and switch unit 23, a pulse that sets the first flipflop 6 at zero, thus stopping the recorder exactly on the end of the marking signal 46, hence just before the beginning of the acoustic signal of the next sequence so that the tape recorder is ready to start on this sequence with the next kilometer signal.

It is readily understood that, according to fortuitous variations of speed of the recorder 1 both in recording and in reproduction, and also because of variations of the period of the oscillator 14, again both in recording and in reproduction, it can happen that the leading edge 56 will not be exactly at the middle of marking period 46, but it is sufficient that this front be inside this period for correct operation, which thus allows a total tolerance of 2 seconds more or less, which is ample for practical requirements.

Thus, because of this arrangement, with an oscillator 14 of any degree of precision and an ordinary tape recorder 1 without great precision as to speed, it is possible to have each acoustic sequence start exactly on the kilometer that corresponds to it, from one end to the other without any buildup of error. It is also understood that detector 53, though it is controlled by an audiofrequency band, cannot be affected by the acoustic signal because this signal does not reach it.

Of course, the precision of the timing of recordings depends upon the precision of the mechanism connecting the vehicle wheels to sensor 2. This may have a slight or even fairly substantial drift in the case in which the path of the vehicle undergoes a deviation with reference to the route originally intended. To correct these errors, there are two switches, one of which, 59, normally closed, is disposed in series on line 3 through which pulses arrive at counter 4 and the other, 60, normally open, allows the sending of kilometer pulses through line 5 as a supplement. In this way, if the tape recorder program is progressing ahead of the position of the vehicle, switch 59 can be opened to allow the vehicle to move along to recover its lag without actuating the device. In the opposite way, if the tape program is behind the movement of the car, extra kilometer pulses can be sent via 60 until the lag is caught up.

The device of the invention, which is relatively simple in manufacture and not bulky, allows various applications. Especially, the user can record on his magnetic tapes concerning a certain route and read then when he goes over the same route again, which can be extremely useful, especially for leaders of a rally. The user can also receive magnetic tapes already prepared for a specific itinerary that he may not be familiar with and never have traveled, which allows him to be guided without any disturbance and with all the necessary information, not only information concerning driving and landmarks along the way but also all kinds of tourist, historic, artistic, gastronomic, hotel information, or even advertising matter.

It is understood that the means of embodiment described above has no limiting character whatsoever and that there may be any desired modifications without exceeding the scope of the invention.

What is claimed is:

1. Apparatus for recording audio information on a recorder means located in a vehicle and for playing back said audio information on a playback means in said vehicle comprising, means for producing a pulse each time said vehicle has traveled a selected distance during the recording of said audio information, means responsive to said pulses for recording said audio information over a pre-determined duration of time, means responsive to the termination of said predetermined duration of time for recording at least a selected audio frequency marking signal for a second predetermined duration of time, means responsive to the termination of said second duration of time for stopping said recording, means responsive to said pulses for playing back said recorded audio information on said playback means, and means for producing a signal beginning at a time after each of said pulses which is equal to said predetermined duration plus one-half of said second predetermined duration and which ends at a time after said each of said pulses equal to said predetermined duration plus said second predetermined duration for stopping the operation of said playback means.

2. Apparatus according to claim 1, further including detector means responsive to the ending of said signal for stopping the operation of said play back means.

3. Apparatus according to claim 2, wherein said predetermined duration is 16 seconds and said second predetermined duration is 4 seconds.

4. Apparatus according to claim 1, wherein said vehicle includes an odometer and said means for producing a pulse includes a sensing means connected to said odometer.

5. Apparatus according to claim 4, wherein said means responsive to said pulses and said means responsive to the termination of said predetermined duration include countermeans.

6. Apparatus according to claim 5, wherein said recording means and said playback means are located in the same unit.

* * * * *